United States Patent
Kim et al.

(10) Patent No.: US 10,505,161 B2
(45) Date of Patent: Dec. 10, 2019

(54) BATTERY MODULE HAVING MOLDING PART FOR INSULATING

(71) Applicant: LG CHEM, LTD., Seoul (KR)

(72) Inventors: Tae Hyuck Kim, Daejeon (KR); Tae Hwan Roh, Daejeon (KR); Yoonhee Lee, Daejeon (KR); Jin Kyu Lee, Daejeon (KR); Junhee Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 366 days.

(21) Appl. No.: 15/311,787

(22) PCT Filed: Apr. 20, 2015

(86) PCT No.: PCT/KR2015/003905
§ 371 (c)(1),
(2) Date: Nov. 16, 2016

(87) PCT Pub. No.: WO2015/182876
PCT Pub. Date: Dec. 3, 2015

(65) Prior Publication Data
US 2017/0125752 A1    May 4, 2017

(30) Foreign Application Priority Data

May 29, 2014  (KR) .................. 10-2014-0064900
Apr. 20, 2015  (KR) .................. 10-2015-0054993

(51) Int. Cl.
*H01M 2/08* (2006.01)
*H01M 10/42* (2006.01)
(Continued)

(52) U.S. Cl.
CPC .......... *H01M 2/08* (2013.01); *H01M 2/0482* (2013.01); *H01M 2/06* (2013.01); *H01M 2/1077* (2013.01);
(Continued)

(58) Field of Classification Search
None
See application file for complete search history.

(56) References Cited

U.S. PATENT DOCUMENTS

2005/0064286 A1    3/2005  Kozu et al.
2005/0151514 A1    7/2005  Kozu et al.
(Continued)

FOREIGN PATENT DOCUMENTS

CN    102842695 A    12/2012
CN    103201879 A    7/2013
(Continued)

OTHER PUBLICATIONS

Extended European Search Report for Application No. 15799928.5, dated Jun. 7, 2017 (6 pages).
(Continued)

*Primary Examiner* — Amanda J Barrow
(74) *Attorney, Agent, or Firm* — Morgan, Lewis & Bockius LLP

(57) ABSTRACT

Disclosed herein is a battery module including a battery cell assembly constituted by at least two battery cells, a front plate and a rear plate fixed to the battery cell assembly such that the front plate and the rear plate cover outermost ones of the battery cells, an electrically insulative cover member mounted at an upper end of the battery cell assembly, the electrically insulative cover member being provided with through holes, through which electrode terminals of the battery cells extend, a PCB mounted on a bottom of the cover member, a plurality of conductive connection parts arranged on the cover member, the conductive connection parts being connected to the electrode terminals of the battery cells and the PCB, and a lower molding part located on the PCB at the bottom of the cover member, the lower
(Continued)

molding part covering the connection between the PCB and the conductive connection parts.

15 Claims, 6 Drawing Sheets

(51) Int. Cl.
    *H01M 2/04*         (2006.01)
    *H01M 2/20*         (2006.01)
    *H01M 2/06*         (2006.01)
    *H01M 10/0525*    (2010.01)
    *H01M 2/10*         (2006.01)

(52) U.S. Cl.
    CPC ....... *H01M 2/206* (2013.01); *H01M 10/0525* (2013.01); *H01M 10/4257* (2013.01); *H01M 2010/4271* (2013.01); *H01M 2220/20* (2013.01)

(56) References Cited

U.S. PATENT DOCUMENTS

| | | | |
|---|---|---|---|
| 2006/0119330 A1* | 6/2006 | Chang | H01M 10/42 323/234 |
| 2006/0214631 A1* | 9/2006 | Yoon | H01M 2/1061 320/112 |
| 2009/0038145 A1 | 2/2009 | Kozu et al. | |
| 2010/0124693 A1* | 5/2010 | Kosugi | G01R 31/3644 429/92 |
| 2012/0301747 A1 | 11/2012 | Han et al. | |
| 2012/0328908 A1* | 12/2012 | Han | H01M 2/1061 429/7 |
| 2013/0071721 A1* | 3/2013 | Ogasawara | H01M 2/1077 429/151 |
| 2013/0143079 A1* | 6/2013 | Huang | H01M 2/1077 429/61 |
| 2013/0189549 A1* | 7/2013 | Nemoto | H01M 10/482 429/7 |
| 2013/0216878 A1* | 8/2013 | Merriman | H01M 2/206 429/92 |
| 2013/0236751 A1 | 9/2013 | Seong et al. | |
| 2014/0065885 A1* | 3/2014 | Nakayama | H01M 2/206 439/627 |

FOREIGN PATENT DOCUMENTS

| | | | | |
|---|---|---|---|---|
| EP | 2538469 A2 | | 12/2012 | |
| JP | 2004-006213 A | | 1/2004 | |
| JP | 2005-209365 A | | 8/2005 | |
| JP | 2012-178440 | * | 9/2012 | ............... H05K 7/20 |
| JP | 2013-161681 A | | 8/2013 | |
| JP | 2014-501021 A | | 1/2014 | |
| JP | 2015-511384 A | | 4/2015 | |
| KR | 10-2004-0085178 A | | 10/2004 | |
| KR | 10-2008-0069376 A | | 7/2008 | |
| KR | 10-2010-0003139 A | | 1/2010 | |
| KR | 10-2010-0003146 A | | 1/2010 | |
| KR | 10-2012-0033044 A | | 4/2012 | |
| KR | 10-2012-0074415 A | | 7/2012 | |
| KR | 2012-0074415 | * | 7/2012 | ............. H01M 2/10 |
| WO | 2013/122405 A1 | | 8/2013 | |
| WO | 2014/189272 A1 | | 11/2014 | |

OTHER PUBLICATIONS

International Search Report and Written Opinion for Application No. PCT/KR2015/003905, dated Jul. 23, 2015.

* cited by examiner

BATTERY MODULE HAVING MOLDING PART FOR INSULATING

The present application claims priority under 35 U.S.C. § 119 to Korean Patent Application Nos. 10-2014-0064900 filed on May 29, 2014 and 10-2015-0054993 filed on Apr. 20, 2015, respectively, and under 35 U.S.C. § 365 to PCT/KR2015/003905, filed on Apr. 20, 2015, the disclosures of which are incorporated herein by reference.

TECHNICAL FIELD

The present invention relates to a battery module including an insulative molding part.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

In addition, technology related to a power storage device that stores electric power and stably supplies the stored electric power to a power system when needed has been developed. The power storage device is a device that stores electric power when power demand is low and supplies the stored electric power in case of overload or emergency. The power storage device provides the effect of improving quality of electric power and energy efficiency. In particular, a market for a household power storage device and a middle-sized industrial or commercial power storage device has been rapidly expanding as the power storage devices are related to smart grid technology.

Meanwhile, for a battery module to provide output and capacity required by a predetermined apparatus or device, it is necessary for the battery module to be configured to have a structure in which a plurality of battery cells is electrically connected to each other in series or in parallel. In addition, it is necessary for the battery module to be configured to have a structure which is easily extendable and stable as the capacity of the battery module is increased.

On the other hand, it is necessary for a battery pack used in an electric bicycle, an electric vehicle, or a hybrid electric vehicle to have durability such that the battery pack does not malfunction in a highly humid condition, such as the rainy season, and in various environments when used for a long period of time.

Particularly for a battery management system (BMS) or a printed circuit board (PCB), circuits are disposed in a dense state and loading density of elements is very high due to a compact structure of the battery pack. In a case in which external foreign matter, especially moisture, is introduced into the BMS or the PCB, therefore, the circuits and the elements may be easily corroded.

In addition, in a case in which moisture is introduced into an electrically connected structure of the arranged battery cells, a short circuit may occur with the result that the battery pack may malfunction or the lifespan of the battery pack may be greatly reduced.

Therefore, there is a high necessity for technology that is capable of fundamentally solving the above problems.

DISCLOSURE

Technical Problem

The present invention has been made to solve the above problems, and other technical problems that have yet to be resolved.

It is an object of the present invention to provide a battery module that is capable to preventing moisture from penetrating into an electrical connection region between a printed circuit board (PCB) and battery cells mounted at the battery module, whereby a defect rate of the battery module is reduced and safety of the battery module is improved.

Technical Solution

In accordance with one aspect of the present invention, the above and other objects can be accomplished by the provision of a battery module including a battery cell assembly constituted by at least two battery cells arranged such that the battery cells are in tight contact with each other or the battery cells are adjacent to each other, a front plate and a rear plate fixed to the battery cell assembly such that the front plate and the rear plate cover outermost ones of the battery cells, an electrically insulative cover member mounted at an upper end of the battery cell assembly, the electrically insulative cover member being provided with through holes, through which electrode terminals of the battery cells extend, a printed circuit board (PCB) mounted on a bottom of the cover member, a plurality of conductive connection parts arranged on the cover member in a state in which the conductive connection parts are mounted at the cover member, the conductive connection parts being connected to the electrode terminals of the battery cells and the PCB to provide electrical connection between the battery cells and the PCB, and a lower molding part located on the PCB at the bottom of the cover member, the lower molding part covering the connection between the PCB and the conductive connection parts.

That is, in the battery module according to the present invention, the insulative molding part is located on the conductive connection parts, to which the electrode terminals are connected, and the PCB, to which the conductive connection parts are connected. Consequently, it is possible to prevent the occurrence of a short circuit between the electrode terminals and to prevent moisture from permeating into electrical connection regions of the battery cells and the PCB, thereby reducing a defect rate and improving safety.

The battery cell assembly may be configured to have a structure in which the battery cells are stacked such that the battery cells are laterally arranged, and each battery cell is fixed to a cartridge. For example, the battery cells may be fixed in a state in which the battery cells are disposed respectively between cartridges or the battery cells may be stacked in a state in which one or more battery cells are mounted in one cartridge.

Each of the cartridges may be provided with fastening holes, through which fastening members are inserted to fix the cartridges to each other to define the battery cell assembly. The fastening holes may be formed at corner regions of each of the cartridges. A fastening member may extend through each of the fastening holes to fix the stacked structure of the cartridges.

For example, each of the battery cells may be a pouch-shaped battery cell configured to have a structure in which an electrode assembly is mounted in a battery case made of a laminate sheet including a resin layer and a metal layer and an outer edge of the battery case is sealed.

Each of the battery cells is not particularly restricted so long as a battery module or a battery pack constituted by the battery cells can provide high voltage and current. For example, each of the battery cells may be a lithium secondary battery having a large storage quantity of energy per volume.

The conductive connection parts may be mechanically coupled to the cover member in a state in which the conductive connection parts are arranged so as to correspond to the through holes of the cover member. Specifically, the through holes, through which the electrode terminals of the stacked battery cells protrude, are arranged at the cover member and the conductive connection parts may be located at regions adjacent to the through holes such that conductive connection parts can be connected to the electrode terminals protruding through the through holes. The conductive connection parts may be fixed to the cover member using various methods. For example, the conductive connection parts may be fixed to the cover member through mechanical coupling using bolts and nuts or fitting.

In order to fix the PCB in position, the bottom of the cover member may be provided with a PCB location part depressed such that the PCB is located at the PCB location part.

The battery cell assembly may be configured to have a structure in which the battery cells are arranged such that cathode terminals and anode terminals of the battery cells protrude upward and the PCB is located between the cathode terminals and the anode terminals. That is, the conductive connection parts may be arranged at opposite sides of the PCB and the conductive connection parts may be connected to the PCB in a state in which the conductive connection parts are connected to the cathode terminals and the anode terminals of the battery cells.

In this case, the conductive connection parts may be connected to the PCB in a structure in which the parts of the conductive connection parts connected to the PCB extend though the cover member from the top to the bottom of the cover member.

Therefore, the electrical connection regions of the conductive connection parts and the PCB is located at the bottom of the cover member, and the lower molding part is added at the bottom of the cover member, which makes it possible to prevent moisture from permeating into electrical connection regions of the conductive connection parts and the PCB.

Meanwhile, bus bars, which are connected to external input and output terminals of the battery module, may be coupled to the outermost conductive connection parts of the conductive connection parts.

In a concrete example, the lower molding part may be configured to have a sealed structure to prevent external moisture from permeating into connection regions between the conductive connection parts and the PCB. Specifically, the lower molding part may be added such that the lower molding part surrounds the connection regions between the conductive connection parts and the PCB so as to secure safety against external impact and permeation of moisture.

More specifically, the PCB is mounted on the bottom of the cover member, and the lower molding part may be added on the PCB.

Further, the lower molding part is made of an insulative resin, and the insulative resin hardens in a state in which the insulative resin is added on the PCB, thereby providing stable bonding for the connection regions between the conductive connection parts and the PCB.

In this case, the lower molding part is added not only at the connection regions between the conductive connection parts and the PCB, but also on the entirety of the PCB. Therefore, the lower molding part may be configured to have a sealed structure to prevent external moisture from permeating into the PCB, and to improve the safety.

In addition, the battery module according to the present invention may further include an upper molding part located at a top of the cover member for preventing permeation of moisture.

The molding part may be made of one selected from among various insulative resins. For example, the molding part may be made of a polyolefin resin or a polycarbonate resin. However, the present invention is not limited thereto.

Meanwhile, the battery module according to the present invention may further include a battery management system (BMS) to control operation of the battery module, wherein the BMS may be mounted on the top of the cover member.

As an example of the structure in which the BMS is mounted, the PCB may be provided with one or more BMS connection parts, the BMS connection parts protrude upward from the PCB and the BMS may be electrically coupled to the BMS connection parts. Specifically, the PCB may be provided with one or more BMS connection parts, the BMS connection parts protrude upward from the PCB and the cover member may be provided with fastening through holes, through which the BMS connection parts extend such that the BMS connection parts are connected to the BMS. Consequently, the BMS connection parts are mounted and coupled in the fastening through holes with the result that the BMS is mounted at the PCB. In addition, each of the fastening through holes may be configured to have a structure in which each of the BMS connection parts protrudes upward and a nut is inserted into each of the fastening through holes.

Meanwhile, two or more fixing parts, which extend while being bent downward so as to cover upper parts of the front or rear plates, may be formed at corners of the cover member. That is, in a case in which the cover member is mounted in a state in which the front plate and the rear plate are fixed to the front and the rear of the battery cell assembly, respectively, the fixing parts are mounted so as to partially cover the upper regions of the front or rear plate such that the front plate and the rear plate can be stably fixed in position.

In accordance with another aspect of the present invention, there is provided a high-output, large-capacity battery pack manufactured using the battery module with the above-stated construction as a unit body, wherein the battery modules includes two or more battery modules electrically connected to each other.

In accordance with a further aspect of the present invention, there is provided a device including the battery pack as a power source. The device may be selected from among an electric vehicle, a hybrid electric vehicle, a plug-in hybrid electric vehicle, and a power storage device.

The structure and manufacturing method of the device are well known in the art to which the present invention pertains and, therefore, a detailed description thereof will be omitted.

Effects Of The Invention

As is apparent from the above description, in the battery module according to the present invention, the insulative molding part is formed on the conductive connection parts, to which the electrode terminals are connected, and the PCB, to which the conductive connection parts are connected. Consequently, it is possible to prevent the occurrence of a short circuit between the electrode terminals and to prevent moisture from permeating into electrical connection regions of the battery cells and the PCB, thereby reducing a defect rate and improving safety.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
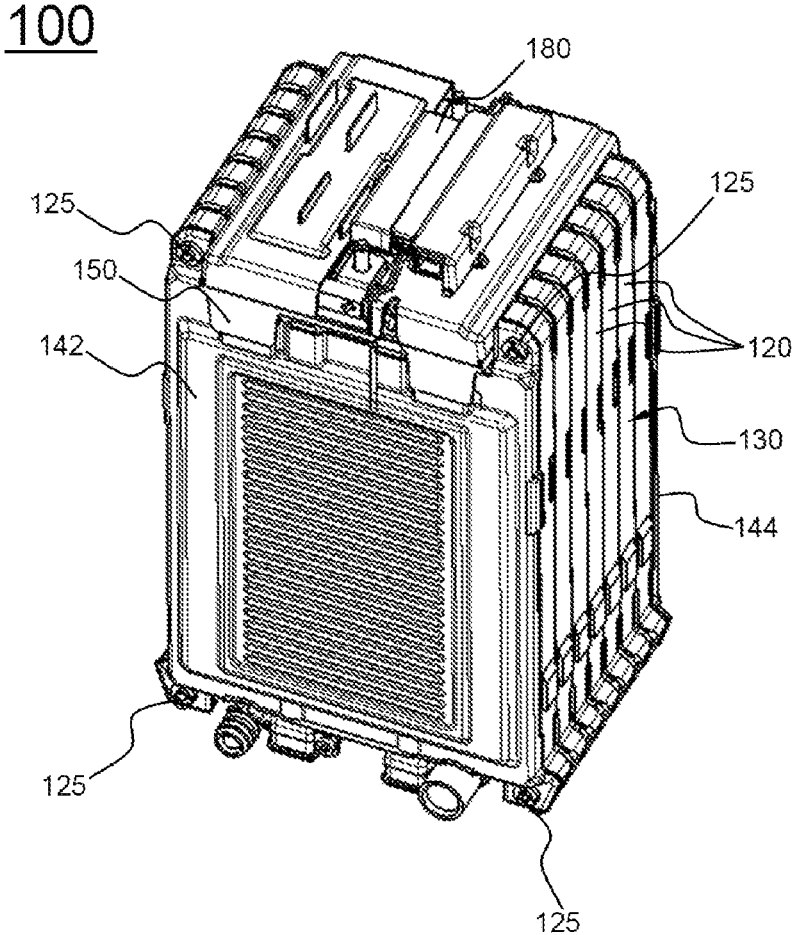
FIG. 1 is a perspective view showing a battery module according to an embodiment of the present invention.
Figure 2:
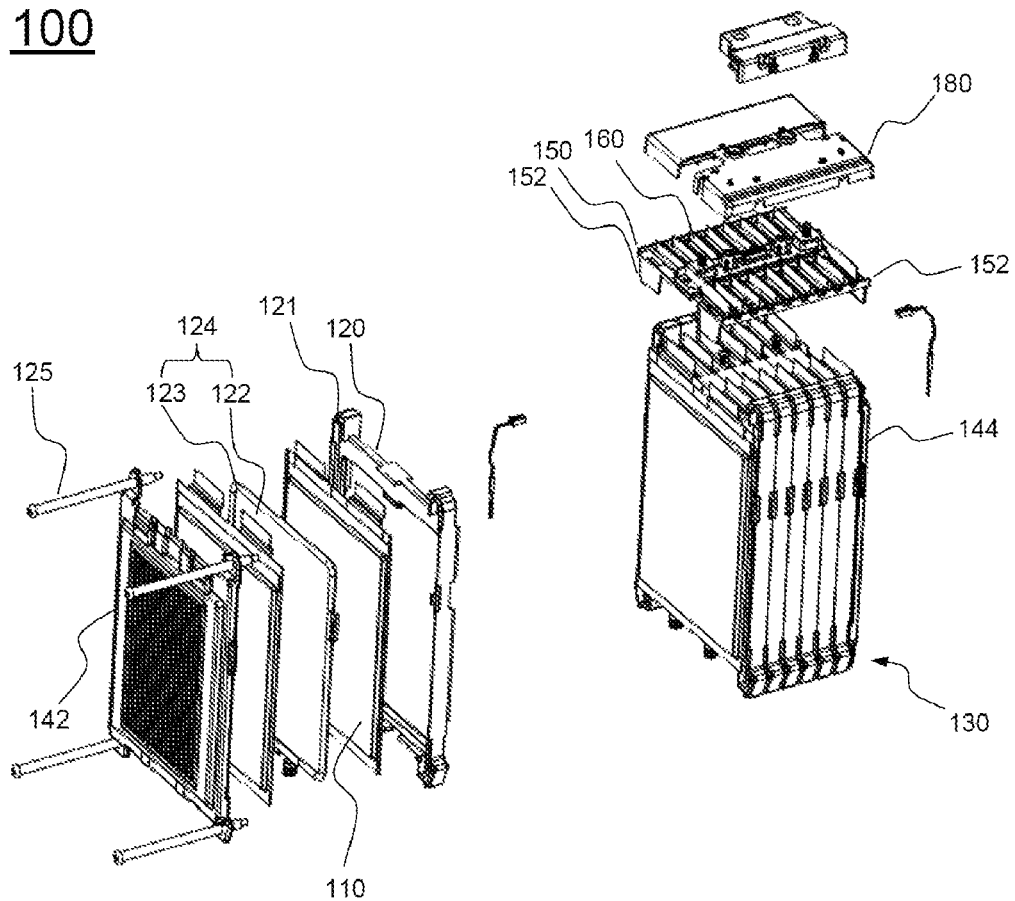
FIG. 2 is an perspective view showing a exploded structure of the battery module of FIG. 1.
Figure 3:
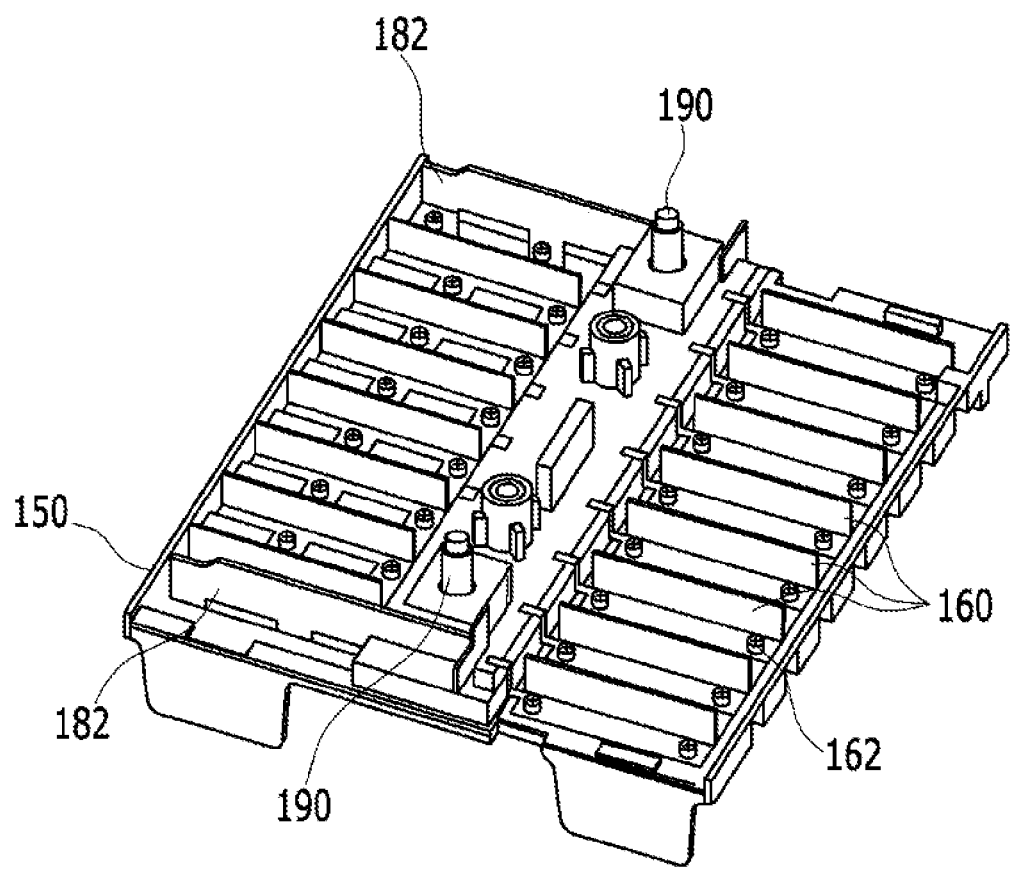
FIG. 3 is a perspective view showing a structure in which conductive connection parts and a printed circuit board (PCB) are mounted at a cover member of FIG. 1.

FIG. 1 is a perspective view showing a battery module according to an embodiment of the present invention and FIG. 2 is an perspective view showing a exploded structure of the battery module of FIG. 1 and FIG. 3 is a perspective view showing a structure in which conductive connection parts are mounted at a cover member of FIG. 1.

Referring to FIGS. 1 to 3, a battery module 100 includes a battery cell assembly 130, a front plate 142, a rear plate 144, a cover member 150, conductive connection parts 160, and BMS 180.

The battery cell assembly 130 includes a plurality of battery cells 110 laterally arranged such that the battery cells 110 are adjacent to each other, and the battery cell assembly 130 is configured to have a structure in which the plurality of the battery cells 110 are stacked laterally in a state in which each of the battery cells 110 is fixed to a cartridge 120 to constitute the battery cell assembly 130. Further, the cartridge 120 is configured to fix sealing parts of the battery cells 110, and a fastening hole 121 is formed at each corner of each of the cartridges 120. That is, a fastening member 125 extends through each of the fastening holes 121 to fix the laterally stacked structure of the cartridges 120.

A front plate 142 and a rear plate 144 protecting the battery cell assembly 130 are fixed to surround outermost battery cells at the front side and the rear side of the battery cell assembly 130, respectively, and the front plate 142 and the rear plate 144 are fixed with the cartridge 120 by the fastening member 125.

A cooling member 124 is disposed between the battery cells 110.

The cooling member 124 comprises plate-shaped heat radiation part 122 disposed between the battery cells 110 in state of which both surfaces respectively face the battery cells 110, coolant flow part 123 provided at outer edges of the heat radiation part 122.

Meanwhile, the BMS 180 for is mounted on the cover member 150 to control the operation of the battery module 100.

Figure 5:
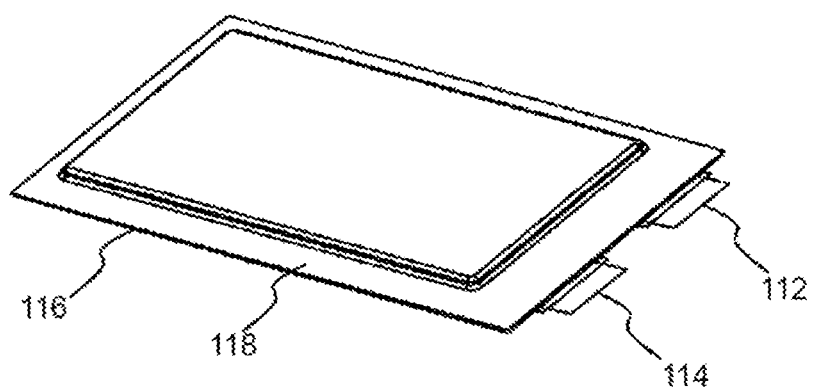
FIG. 5 is a perspective view showing a battery cell included in the battery module of FIG. 1.

As shown in FIG. 5, each of the battery cells constituting the battery cell assembly 130 is configured to have a structure in which electrode terminals 112 and 114 protrude from one side of each of the battery cells. The battery cells are stacked such that the electrode terminals 112 and 114 are located at the upper end of the battery cell assembly 130.

Figure 4:
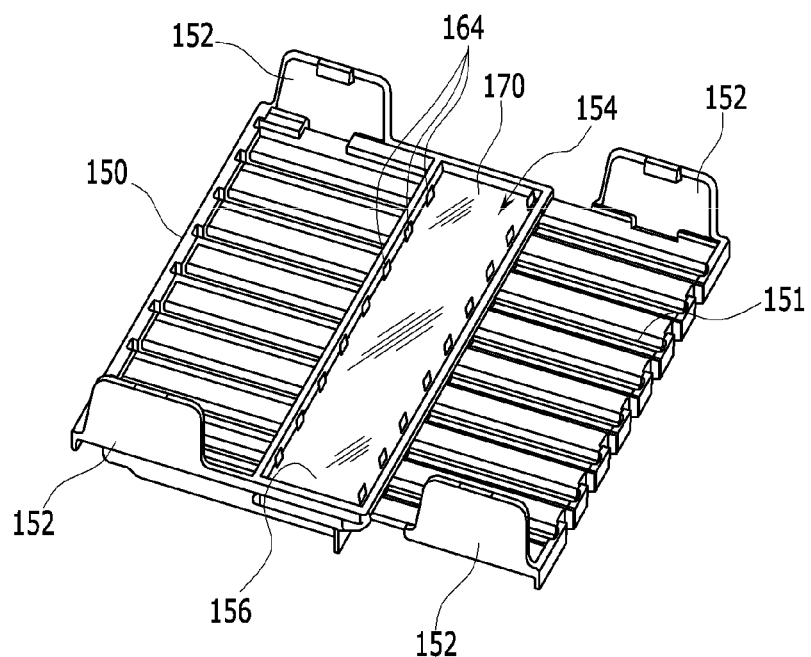
FIG. 4 is a bottom view of FIG. 3.

An electrically insulative cover member 150 is mounted at the upper end of the battery cell assembly 130. As shown in FIG. 4, the cover member 150 is provided with through holes 151, through which the electrode terminals 112 and 114 extend.

A plurality of conductive connection parts 160 connected to the electrode terminals of the battery cells are mounted on the cover member 150. A BMS connection part 172 is formed on the center portion of the cover member 150 at which a battery management system (BMS) 180 is mounted.

Figure 7:
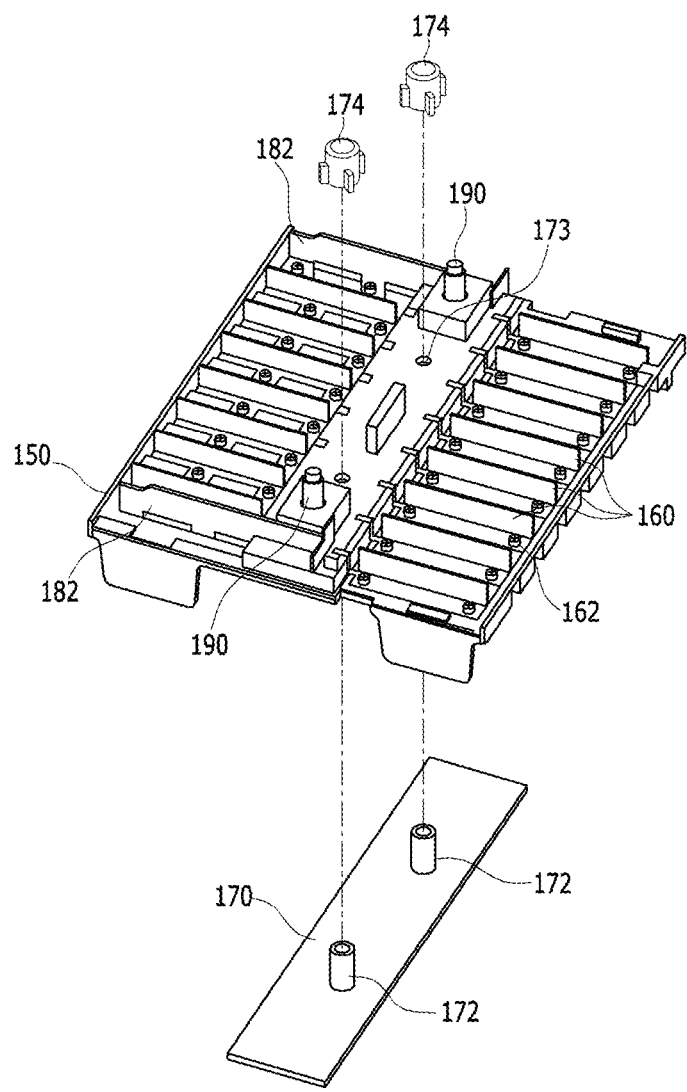
FIG. 7 is a perspective view showing an exploded structure of a cover member and a printed circuit board.

Specifically, as shown in FIG. 7, two BMS connection parts 172 are formed on the center portion of the PCB 170 to extend through cover member 150. The BMS 180 is electrically coupled to the BMS connection parts 172. Each of the BMS connection parts 172 protrudes upward in a state in which each of the BMS connection parts 172 extends through the cover member 150 via fastening through holes 173 to connect with the BMS 180, and a nut 174 is inserted into each of the fastening through holes 173.

The conductive connection parts 160 are coupled to the cover member 150 by bolts 162 in a state in which the conductive connection parts 160 are arranged so as to correspond to the through holes of the cover member 150. That is, the conductive connection parts 160 are fixed at positions adjacent to the through holes such that the electrode terminals protruding outward through the through holes are connected to the conductive connection parts 160.

In addition, a upper molding part made of an insulative resin, in order to prevent the occurrence of a short circuit between the electrode terminals and achieve watertightness of the PCB 170, may be added on the cover member 150 in a state in which the conductive connection parts 160 are mounted on the cover member 150.

Bus bars 182, which are connected to external input and output terminals 190 of the battery module 100, are connected to outermost conductive connection parts of the conductive connection parts 160.

FIG. 4 is a bottom view of FIG. 3.

Referring to FIG. 4 with FIG. 1, fixing parts 152, which extend while being bent so as to cover upper parts of the front or rear plates 142, 144, are formed at corners of the cover member 150. That is, the fixing parts 152 are mounted to partially cover the upper parts of the front or the rear plates 142, 144 in a state in which the front plate 142 and the rear plate 144 are fixed to the front and the rear of the battery cell assembly 130, respectively, such that the cover member 150 is stably fixed in position.

The bottom of the cover member 150 is provided with a PCB location part 154 depressed such that the PCB 170 is located at the PCB location part 154.

The PCB 170 is located at the PCB location part 154, and the PCB 170 is connected to parts 164 of the conductive connection parts.

The parts 164 of the conductive connection parts 160 are mounted to the cover member 150 in a state in which the parts extend through the cover member 150 downwardly, and electrically connect to the PCB located on the bottom of the cover member 150.

According to the above structure, the cover member 150, the PCB 170, the conductive connection parts, and the BMS may be assembled as a single structure which is mounted on the top of the battery module. Therefore, when the battery module is abnormally operated due to defects, it is possible to easily replace parts that have the defects or disassemble the structure to repair the parts.

Figure 6:
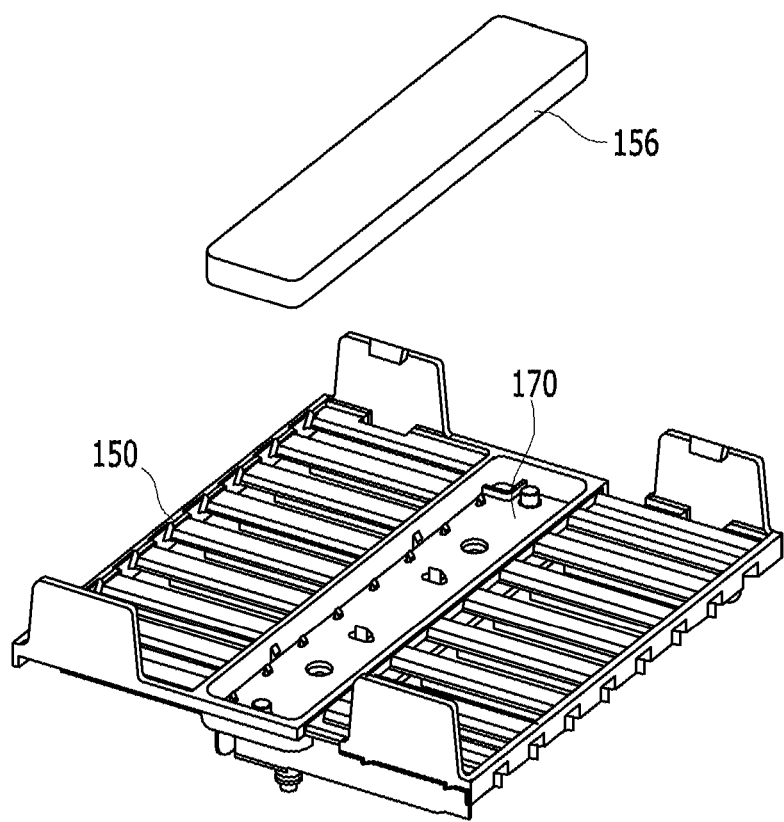
FIG. 6 is a bottom view of FIG. 3 with a separated molding part.

As illustrated in FIGS. 4 and 6, a lower molding part 156 made of an insulative resin is located on the PCB at the bottom of the cover member 150 so as to prevent a short circuit between the electrode terminals and secure water-tightness of the PCB 170.

FIG. 5 is a perspective view showing a battery cell included in the battery module of FIG. 1.

Referring to FIG. 5, the battery cell 110 is configured to have a structure in which an electrode assembly (not shown) is contained in a battery case 116 made of a laminate sheet together with an electrolyte and an outer edge 118 of the battery case is sealed. Electrode terminals 112 and 114 are formed at one side of the battery case 116. The battery cell 110 is configured to have a rectangular plate-shaped structure such that a plurality of battery cells are efficiently stacked.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module comprising:
a battery cell assembly including at least two battery cells arranged such that the battery cells are in contact with each other or the battery cells are adjacent to each other;
a front plate and a rear plate fixed to the battery cell assembly such that the front plate and the rear plate cover outermost ones of the battery cells;
an electrically insulative cover member mounted at an upper end of the battery cell assembly, the electrically insulative cover member being provided with through holes, through which electrode terminals of the battery cells extend;
a printed circuit board (PCB) mounted on a bottom of the cover member;
a plurality of conductive connection parts arranged on the cover member in a state in which the conductive connection parts are mounted at the cover member, the conductive connection parts being connected to the electrode terminals of the battery cells and the PCB to provide electrical connection between the battery cells and the PCB;
a lower molding part located on the PCB at the bottom of the cover member, the lower molding part covering the connection between the PCB and the conductive connection parts; and
a battery management system (BMS) to control operation of the battery module, wherein the BMS is mounted on the top of the cover member,
wherein the PCB is provided with BMS connection parts, and the BMS connection parts protrude upward from the PCB, and
wherein the cover member is provided with fastening through holes, through which the BMS connection parts extend such that the BMS connection parts are connected to the BMS.

2. The battery module according to claim 1, wherein the battery cell assembly is configured to have a structure in which the battery cells are stacked such that the battery cells are laterally arranged, and
wherein each battery cell is fixed to a cartridge.

3. The battery module according to claim 2, wherein each cartridge is provided with fastening holes through which fastening members are inserted to fix the cartridges to each other to define the battery cell assembly.

4. The battery module according to claim 1, wherein each of the battery cells is a pouch-shaped battery cell configured to have a structure in which an electrode assembly is mounted in a battery case made of a laminate sheet comprising a resin layer and a metal layer.

5. The battery module according to claim 1, wherein each of the battery cells is a lithium secondary battery.

6. The battery module according to claim 1, wherein the conductive connection parts are mechanically coupled to the cover member in a state in which the conductive connection parts are arranged so as to correspond to the through holes of the cover member.

7. The battery module according to claim 1, wherein the bottom of the cover member is provided with a PCB location part depressed such that the PCB is located at the PCB location part.

8. The battery module according to claim 1, wherein the battery cell assembly is configured to have a structure in which the battery cells are arranged such that cathode terminals and anode terminals of the battery cells protrude upward, and
wherein the PCB is located between the cathode terminals and the anode terminals.

9. The battery module according to claim 1, wherein the BMS is electrically coupled to the BMS connection parts.

10. The battery module according to claim 1, wherein each of the fastening through holes is configured to have a structure in which each of the BMS connection parts protrudes upward and a nut is inserted into each of the fastening through holes.

11. The battery module according to claim 1, wherein two or more fixing parts, which extend while being bent downward so as to cover upper parts of the front or rear plates, are formed at corners of the cover member.

12. A battery pack comprising at least one battery module according to claim 1.

13. A device comprising a battery pack according to claim 12.

14. The device according to claim 13, wherein the device is an electric vehicle, a hybrid electric vehicle, a plug-in hybrid electric vehicle, or a power storage.

15. The battery module according to claim 1, wherein the lower molding part is made of an insulative resin.

* * * * *